United States Patent [19]
Langley

[11] 3,713,748
[45] Jan. 30, 1973

[54] GAS TURBINE DUCTED FAN ENGINE

[75] Inventor: Kenneth Richard Langley, Dursley, England

[73] Assignee: Minister of Aviation Supply in Her Majesty's Government of the United Kingdom of Great Britain and Northern Ireland, London, England

[22] Filed: April 19, 1971

[21] Appl. No.: 135,343

[30] Foreign Application Priority Data

April 28, 1970 Great Britain.....................20,247/70

[52] U.S. Cl. .....................415/77, 415/79, 415/119, 60/226
[51] Int. Cl..............................................F01d 1/04
[58] Field of Search ............415/77, 79, 119; 60/226

[56] References Cited

UNITED STATES PATENTS

| 3,112,865 | 12/1963 | Gisslen | 415/79 |
| 3,283,995 | 11/1966 | Fligg, Jr. | 415/192 |
| 3,471,080 | 10/1969 | Gray | 415/119 |
| 3,486,328 | 12/1969 | Boudigues | 415/79 |

Primary Examiner—C. J. Husar
Attorney—Stevens, Davis, Miller & Mosher

[57] ABSTRACT

A gas turbine engine having a multi-stage fan in which the blade rows are spaced apart by at least one and a half chord widths of the adjacent upstream blade to reduce noise. A flow splitter divides the flow through the fan into radially outer and inner flow passages. The first row of stator blades of the fan is reduced in chord width in the inner passage and an additional stage of blading is disposed in the inner passage only, between the first row of stator blades and the second row of rotor blades.

2 Claims, 1 Drawing Figure

PATENTED JAN 30 1973
3,713,748
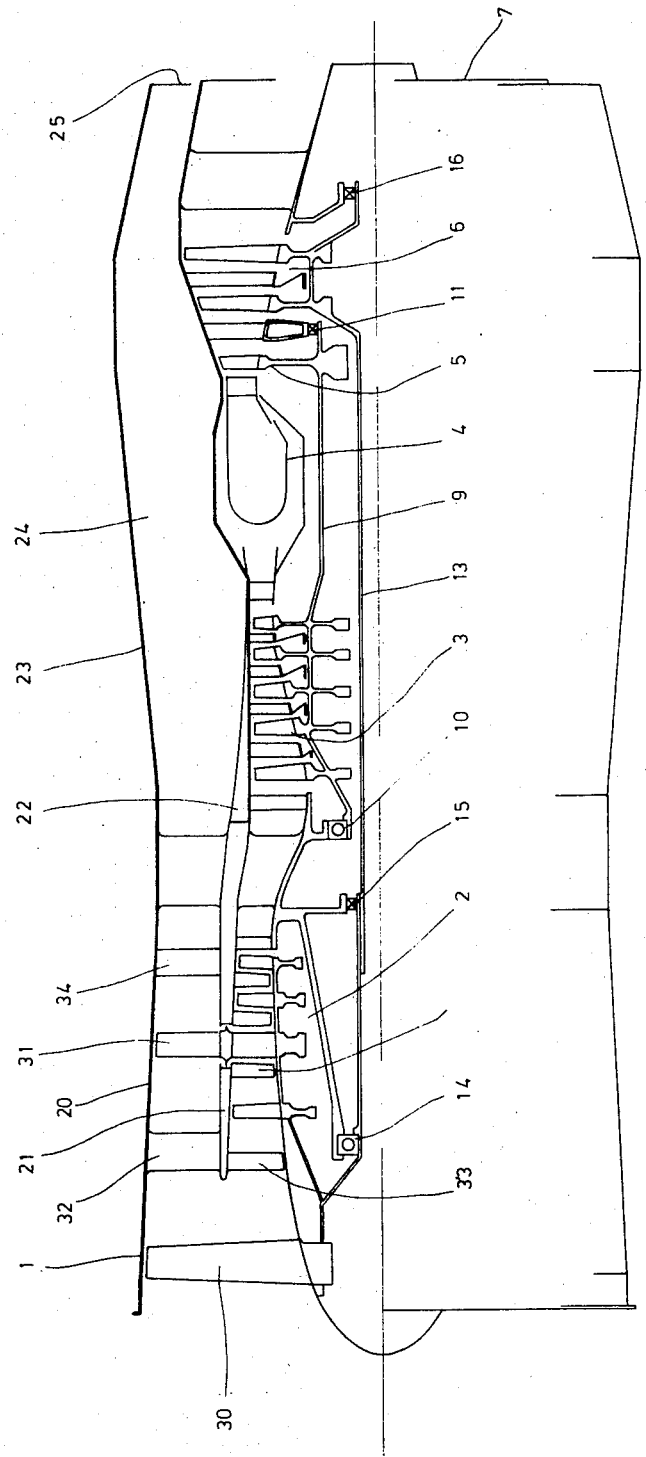

GAS TURBINE DUCTED FAN ENGINE

The present invention relates to gas turbine engines, and has particular reference to multi-stage ducted fan gas turbine engines.

It is to be understood that a fan or compressor stage in this specification defines both the rotor blade row and its corresponding stator blade row.

It is known that part of the noise which is generated by a fan of a gas turbine is provided by the wakes produced in the fluid flow by the upstream blade rows of the fan interacting on the downstream blade rows. In order to reduce the noise produced by a fan, therefore, it has been suggested that the rotor and stator rows of the stage of a fan should be separated by at least twice the axial chord length of the blades in the upstream row.

Where a multi-stage fan is required, however, this tends to produce very long engines.

According to the present invention there is provided a gas turbine engine comprising a multi-stage fan mounted in an annular flow duct, the fan including first and second rows of rotor blades, a flow splitter which divides the duct into radially inner and outer flow passages, the rows of rotor blades extending across both passages, first rows of stator blades extending across each passage between the rotor blade rows, the rows of blades in at least the outer flow passage being axially spaced from the adjacent upstream blade row by at least one and a half times the length of the chord of the blades in said upstream row, the radially inner passage additionally including a row of rotor and stator blades disposed between said first row of stator blades and the second row of rotor blades.

In a preferred embodiment at least the first four rows of blading in the inner passage are also separated in the direction of fluid flow by twice the chord width of the upstream blade.

One example of the invention will now be more particularly described with reference to the accompanying drawing which illustrates a gas turbine engine constructed according to the present invention.

Referring now to the drawing, there is illustrated a gas turbine jet propulsion engine having a two stage front fan, indicated generally by the reference number 1, an intermediate pressure (I.P.) compressor 2, a high pressure (H.P.) compressor 3, combustion equipment 4, an H.P. turbine 5, a low pressure (L.P.) turbine 6 and a propulsion nozzle 7 all in flow series.

The H.P. compressor, the combustion equipment and the turbines may all be of conventional construction and will not be described in detail. It is only necessary to say that the H.P. turbine drives the H.P. compressor by means of an H.P. shaft 9 mounted in front and rear bearings 10 and 11 respectively, while the L.P. turbine drives both the fan and the I.P. compressor by means of a shaft 13 mounted in front, intermediate and rear bearings, 14, 15 and 16 respectively.

The fan is mounted in a duct 20 which is divided into inner and outer flow passages by a splitter 21 which in fact forms the leading edge of the inner casing 22 of the engine which surrounds the compressors, combustion equipment and turbines. An outer casing 23 defines with the inner casing 22 and the splitter 21 an annular by-pass duct 24 through which flows part of the air compressed by the fan. At the downstream end of the by-pass duct 24, the air is discharged to atmosphere through an outer annular propulsion nozzle 25 which surrounds the propulsion nozzle 7.

The fan 1 has two rows of rotor blades 30 and 31 which both extend across the whole width of the duct 20. The first rotor blade row is disposed upstream of the splitter 21 but the second rotor blade row is divided into radially inner and outer tiers by the splitter. The splitter is supported from the outer casing 23 by a ring of vanes 32 which constitute the stator row of the first fan stage in the outer passage. The vanes 32 additionally support a ring of vanes 33 which constitute the stator row of the first fan stage in the inner passage.

In order to reduce the noise emanating from the fan, the rotors and stators of the fan stages must be spaced apart by substantially twice the chord of the upstream row of blades or vanes.

Since the noise from the fan is greater at the tip it is essential that at least in the outer passage that the wide spacing is adopted. Hence the stator vanes 32 are disposed downstream of the rotor blades 30 by a distance of twice the chord lengths of the rotor blades 30, the rotor blades 31 are similarly disposed downstream of the stator vanes by a distance of twice the chord width of the stator vanes 32, and a second row of stator vanes 34 are disposed downstream of the rotor blades 31 by a distance of twice the chord length of the rotor blades 31. The stator vanes 34 and the rotor blades 31 constitute the second stage of the fan in the outer passage.

An intermediate compression stage is inserted in the gap between first stage fan stator and the second stage fan rotor. This compression stage may be the first stage of the I.P. compressor moved forward and thus the overall length of the engine is reduced, or, alternatively, it may be a stage additional to the I.P. compressor stages which supercharges the air flow at the roots of the fan rotors to increase the pressure ratio at the root. Although there is no reduction in overall engine length with this arrangement, compared to a two stage fan engine with wide blade spacing, a higher pressure ratio is available from the fan for no increase in length, or, alternatively, the fan can run more slowly for the same pressure ratio and will thus be quieter in operation.

As an additional noise reducing feature successive rotors and stators in the inner passage may also be spaced apart by twice the chord length of the upstream blade or vane.

This can also be achieved without increase in length because the stator vanes 33 are supported from the vanes 32 and need not be so big. By reducing the chord width of the vanes 33 therefore, the intermediate rotor and the following stator can be spaced approximately two chord lengths downstream of its respective upstream blade or vane within the space between the vanes 33 and the inner tier of the rotor blades 31.

Thus the noise from the first two stages in the inner passage can also be reduced.

Beyond the first two stages little is to be gained by spacing the rotors and stators of further stages two chord lengths apart, due to further increasing the length of the engine and hence its weight.

If desired, however, the rotor and stator rows in the outer passage may be spaced apart further and the third inner stage can be opened out to two chord length spacing.

Clearly the two chord length spacing is not limiting as substantial gains may be obtained by a spacing down to 1½ chord lengths from the upstream blade or vane.

Such spacing may be adopted for the later stage of the fan where a greater spacing would gain very little.

Alternatives to the above illustrated embodiment may be used. For example the fan may have three stages which extend across the whole width of the duct, and intermediate stages extending across only the inner passage would be disposed between all the rotors of the fan.

Alternatively more than one intermediate stage may be used in the inner duct between any two rotors of the fan.

I claim:

1. A gas turbine engine comprising a multi-stage fan mounted in an annular flow duct, the fan including first and second rows of rotor blades, a flow splitter which divides the duct into radially inner and outer flow passages, the rows of rotor blades extending across both passages, first rows of stator blades extending across each passage between the rotor blade rows, the rows of blades in at least the outer flow passage being axially spaced from the adjacent upstream blade row by at least one and a half times the length of the chord of the blades in said upstream row, the radially inner passage additionally including a row of rotor and stator blades disposed between said first row of stator blades and the second row of rotor blades.

2. A gas turbine engine according to claim 1 and in which the first row of stator blades which extend across the inner flow passage are of reduced chord length compared to the first row of stator blades in the outer flow passage, and at least the first four rows of blading in the inner flow passage are axially spaced apart by at least one and a half chord lengths of the adjacent upstream blade row.

* * * * *